United States Patent
Knapp et al.

(10) Patent No.: US 8,946,970 B2
(45) Date of Patent: Feb. 3, 2015

(54) SYSTEMS AND METHODS FOR WIRE CONTAINMENT WITHIN AN ELECTRIC MOTOR

(75) Inventors: John M. Knapp, Claremore, OK (US); Sean A. Cain, Owasso, OK (US); Michael R. Rumbaugh, Claremore, OK (US); Carlos A. Prieto, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 353 days.

(21) Appl. No.: 13/330,985

(22) Filed: Dec. 20, 2011

(65) Prior Publication Data
US 2013/0154431 A1  Jun. 20, 2013

(51) Int. Cl.
*H02K 3/48* (2006.01)
*H02K 3/34* (2006.01)

(52) U.S. Cl.
USPC ............................ 310/214; 310/215

(58) Field of Classification Search
CPC .................... H02K 3/487; H02K 3/48
USPC ................................. 310/214, 215
See application file for complete search history.

(56) References Cited

U.S. PATENT DOCUMENTS

| | | | | |
|---|---|---|---|---|
| 3,624,432 | A * | 11/1971 | Merz | 310/53 |
| 6,274,240 | B1 * | 8/2001 | McBane | 428/377 |
| 2010/0187942 | A1 * | 7/2010 | McCartney et al. | 310/214 |
| 2011/0109188 | A1 * | 5/2011 | Shaver et al. | 310/215 |

* cited by examiner

*Primary Examiner* — Terrance Kenerly
(74) *Attorney, Agent, or Firm* — Law Offices of Mark L. Berrier

(57) ABSTRACT

Systems and methods for the construction of electric motors, where expandable material is inserted into the slots in which magnet wires are positioned and expanded in the slots to mechanically restrain the wires. One embodiment comprises a downhole electric motor such as might be used in an electric submersible pump (ESP) system. The motor has a stator with multiple slots in which magnet wires are positioned. A slot liner is positioned in each slot and an expansion pad is positioned in each slot between the slot liner and the slot wall nearest the bore of the stator. The wires are positioned inside the slot liner. When the motor is almost completely assembled, it is filled with oil. Some of the oil is absorbed by the expansion pads, which then expand to fill the unoccupied volume in the slots, thereby restraining the movement of the wires within the slots.

14 Claims, 6 Drawing Sheets

SYSTEMS AND METHODS FOR WIRE CONTAINMENT WITHIN AN ELECTRIC MOTOR

BACKGROUND

1. Field of the Invention

The invention relates generally to the construction of electric motors, and more particularly to systems and methods for constructing electric motors in which an expandable material is inserted into the slots in which magnet wires are positioned, and wherein the material is expanded in the slots to mechanically restrain the wires to prevent damage that might result from movement of the wires within the slots.

2. Related Art

A typical electric motor has two primary components: a rotor; and a stator. The stator is a stationary component, while the rotor is a movable component which rotates within the stator. Typically, in an AC induction motor, magnetic fields are generated in the stator and are induced into the rotor. The interaction of the magnetic fields created by the stator and the rotor cause the rotor to rotate within the stator.

The motor incorporates electromagnets that generate changing magnetic fields when current supplied to the electromagnets is varied. These electromagnets are normally formed by positioning coils (windings) of insulated wire around ferromagnetic cores. In an AC induction motor, the ferromagnetic cores are formed between "slots" in the stator core. When electric current is passed through the wire, magnetic fields are generated around the wire and consequently in the ferromagnetic cores. Changing the magnitude and direction of the current changes the magnitude and polarity of the magnetic fields generated by the electromagnets.

Electric motors that are designed for downhole applications (such as driving an electric submersible pump) are typically AC induction motors. These motors, generally speaking, are long and narrow. Usually, downhole motors are less than 10 inches in diameter, and they may be tens of meters long. This extremely elongated shape drives many aspects of a downhole motor's design. For example, because downhole electric motors are typically very long, many of these motors employ a closed-slot design which serves to confine the magnet wires within the slots of the stator. The slots are often at least partially filled with epoxy or varnish to hold the wires in position and to provide additional electrical insulation around the wires.

In very high-temperature applications, however, varnishes and epoxies may become chemically unstable and break down. When this occurs, the wires may move within the slots, allowing the wires, particularly the insulating coatings around the wires, to become damaged. Damage to the magnet wires may cause the motor itself to fail. It would therefore be desirable to provide improved systems and methods to restrain the wires within the slots in high-temperature and other applications, thereby increasing the reliability, run life and thermal capability of the motor.

SUMMARY OF THE INVENTION

The present invention includes systems and methods for the construction of electric motors, where expandable material is inserted into the slots in which magnet wires are positioned, and where the material is expanded in the slots to mechanically restrain the wires, preventing damage that might otherwise result from movement of the wires within the slots.

One embodiment comprises a system for containment of magnet wires in an electric motor such as might be used in an electric submersible pump (ESP) system. In this system, an electric motor has multiple slots (e.g., in the stator) in which magnet wires are positioned. An expansion pad is positioned in each of the slots. A slot liner may be positioned in each slot to provide a protective insulating barrier between the wires in and the walls of the slot. The expansion pad may be positioned between the slot liner and the slot wall. Preferably, the expansion pad is positioned adjacent to the slot wall which is nearest to the bore of the stator. Each of the expansion pads occupies a first volume when it is first positioned in the corresponding slot. After installation of the expansion pad and the wires in the slots, each expansion pad is expanded to occupy a greater volume so that there is little or no room for the wires to move in the slots. In this embodiment, the pads are expanded by filling the motor with oil, wherein the oil is absorbed by the pads, which then swell to their expanded size.

Another embodiment comprises a method for assembling an electric motor, such as might be used in an ESP system. The method includes providing a stator core having a plurality of slots, positioning magnet wires in the slots, positioning unexpanded expansion pads in the slots, and expanding the pads to occupy portions of the slots which are not occupied by the magnet wires and thereby inhibit movement of the magnet wires within the slots. Slot liners may be positioned in the slots, and the expansion pads may be positioned either between the slot liner and the slot wall, or inside the slot liner. The expansion pad is preferably positioned against the slot wall which is nearest to the bore of the stator. The expansion pads may be expanded by filling the motor with oil that is absorbed by the pads.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
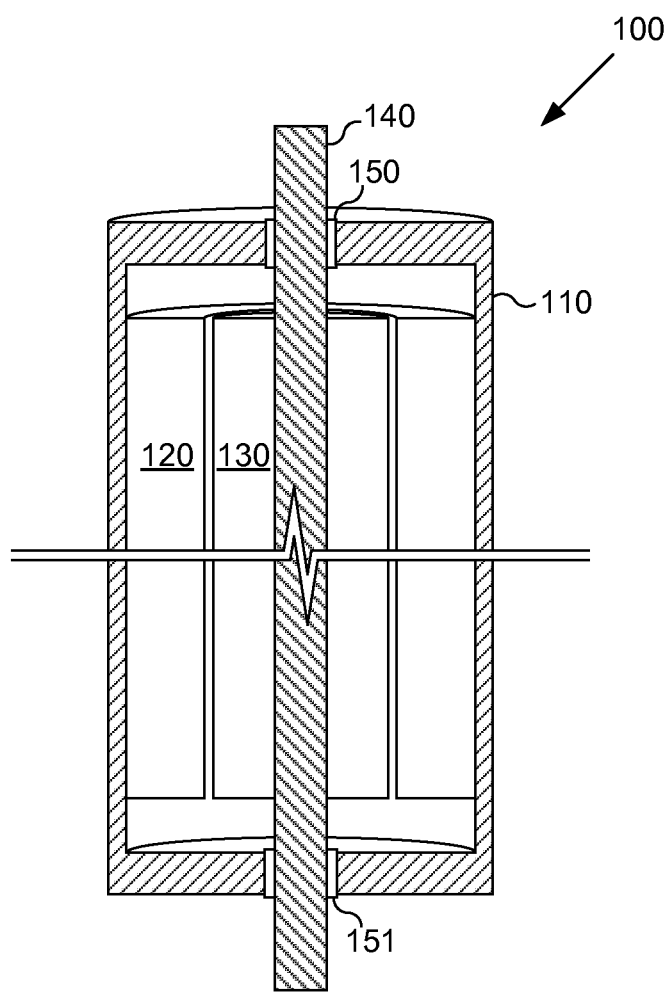
FIG. 1 is a diagram illustrating the general structure of an electric motor.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for constructing electric motors, wherein an expandable material is inserted into the slots in which magnet wires are positioned. The material is expanded in the slots to mechanically restrain the wires to prevent damage that might result from movement of the wires within the slots.

In one embodiment, a motor for a system such as an electric submersible pump (ESP) is constructed using a stator having a closed-slot design. In this embodiment, an insulating slot liner is inserted into each of the slots of the stator core and an expansion pad is inserted into the slot between the slot liner and the wall of the slot. In an alternative embodiment, the expansion pad may be positioned within the slot liner, adjacent to the wires. Magnet wires are then installed within the slots using conventional means. Normally, after the desired number of turns of wire have been threaded through the slots, there is additional space in the slots that is not occupied by the wire. The expansion pads take up a portion of the unoccupied space in each slot. Preferably, the expansion pad is positioned on the side of the slot adjacent to the bore of the stator core.

During the final stages of assembly, the motor is filled with oil. The oil is absorbed into the expansion pads, causing them to expand from an initial volume to an expanded volume. As the volume of the expansion pad increases, the pad forces the slot liner inward toward the magnet wires, reducing the unoccupied space in the slot and thereby inhibiting movement of the wires within the slot.

Referring to FIG. 1, a diagram illustrating the general structure of an electric motor is shown. As depicted in the figure, motor 100 has a housing 110 that contains a stator 120 and a rotor 130. Stator 120 remains stationary within housing 110. Stator 120 has a generally annular shape (cylindrical with a coaxial cylindrical space in the middle). Rotor 130 is generally cylindrical in shape and is coaxially positioned within the cylindrical space in the center of stator 120. Rotor 130 has a shaft 140 that runs through the center of it. Shaft 140 is held in position within housing 110 by bearings 150 and 151. Shaft 140 can rotate within bearings 150, 151, thereby allowing rotor 130 to rotate within stator 120.

Rotor 130 is caused to move within stator 120 by changing magnetic fields. In an AC induction motor, varying electric currents in the windings of stator 120 create magnetic fields. These magnetic fields induce an electromotive force in rotor 130, thereby causing the rotor to generate its own magnetic fields. The interaction of the magnetic fields of stator 120 and rotor 130 causes the rotor to rotate within the stator.

Figure 2:
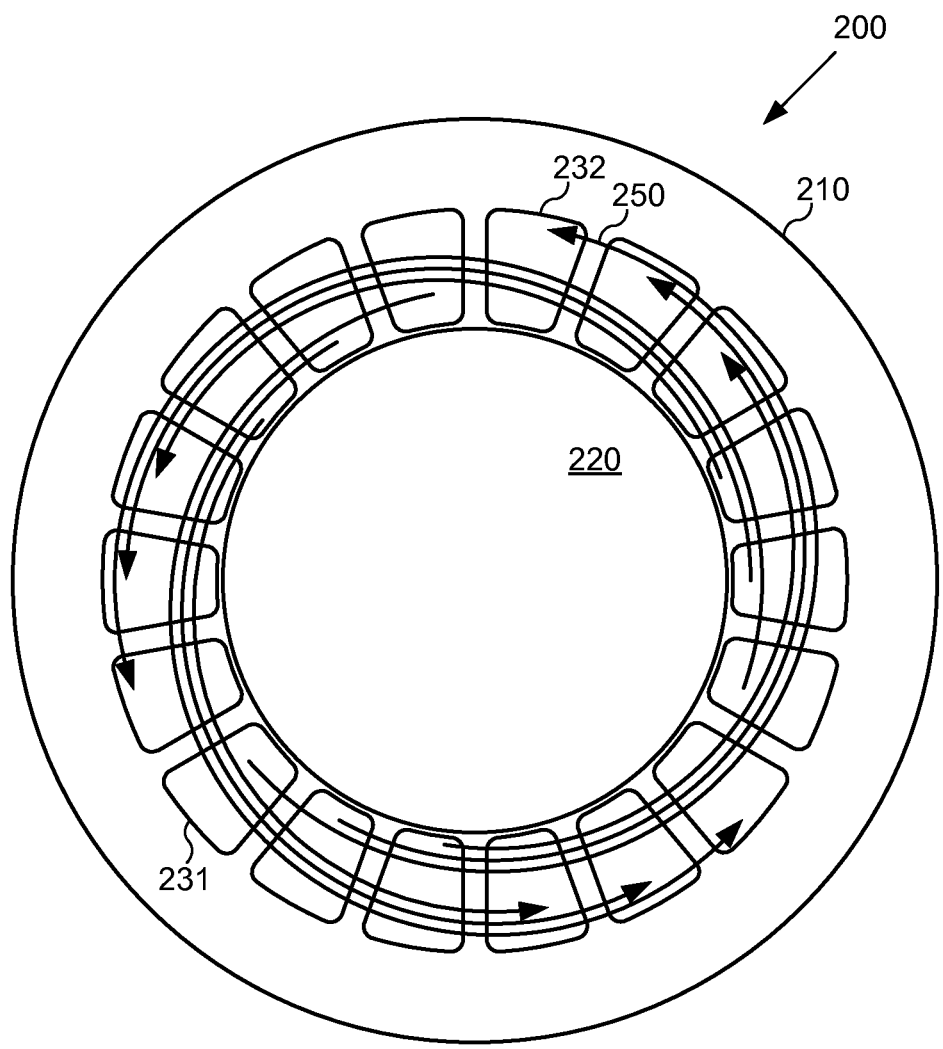
FIG. 2 is a diagram illustrating the end of a conventional closed-slot stator core designed for use in an AC induction motor.

Referring to FIG. 2, a diagram illustrating the end of a conventional closed-slot stator core designed for use in an AC induction motor is shown. Stator core 200 is generally annular, with a cylindrical outer portion 210 and a cylindrical space 220 in its center. A plurality of passageways (e.g., 231-232) are formed in stator core 200. These passageways are often referred to as "slots" because they are sometimes open to the cylindrical space in the center of the stator. In this example, however, they are closed and form tubular passageways through the stator core.

The slots (e.g., 231-232) extend entirely through the stator core so that wires can be threaded through them. A wire is threaded through one slot and back through a different slot to form a turn of wire. The wire is threaded through these same slots multiple times to form a coil. The walls between the slots, sometimes referred to as "teeth", serve as ferromagnetic cores, so that when a wire is wrapped around one or more of them, and current is passed through the wire, an electromagnet is formed. Although a wire could be threaded through adjacent slots in the stator core, this typically is not the case with induction motors. Thus, for example, a wire may be threaded upward through slot 231, and then back through slot 232, as shown by arrow 250. This may be repeated to form multiple turns. The other arrows in the figure show how wires may be threaded through the other slots to form the remaining wire coils. The particular winding pattern shown in the example of FIG. 2 is a two-pole, concentric winding.

The wires that are threaded through the passageways in the stator core are typically copper wires that have an insulating coating. This insulating coating is intended to electrically insulate each turn of wire from the others so that current will pass through each of the turns, rather than bypassing one or more turns of wire if a short-circuit is created by electrical contact between the wire of two or more turns. As noted above, each time one of the wires is threaded through one of the slots, the layer of insulation around the wire may be damaged.

Typically, the wires do not fill the entire volume of the slots. This is in part because there has to be enough room to thread the wires through the slots. If there is not enough room in the slots, it may be difficult simply to thread the wires through the slots. Further, abrasion between the wires may damage the insulating coatings on the wires and increase the risk of a short circuit between the wires.

After all of the turns of wire have been threaded through the slots, it is not desirable to have open space in the slots (i.e., space that is not occupied by the wires). This space allows the wires to move within the slots. During shipment, installation or operation of the assembled motor, movement of the motor may cause the wires to move, which may result in damage to the wires as they scrape against each other or against the walls and edges of the slots.

Figure 3:
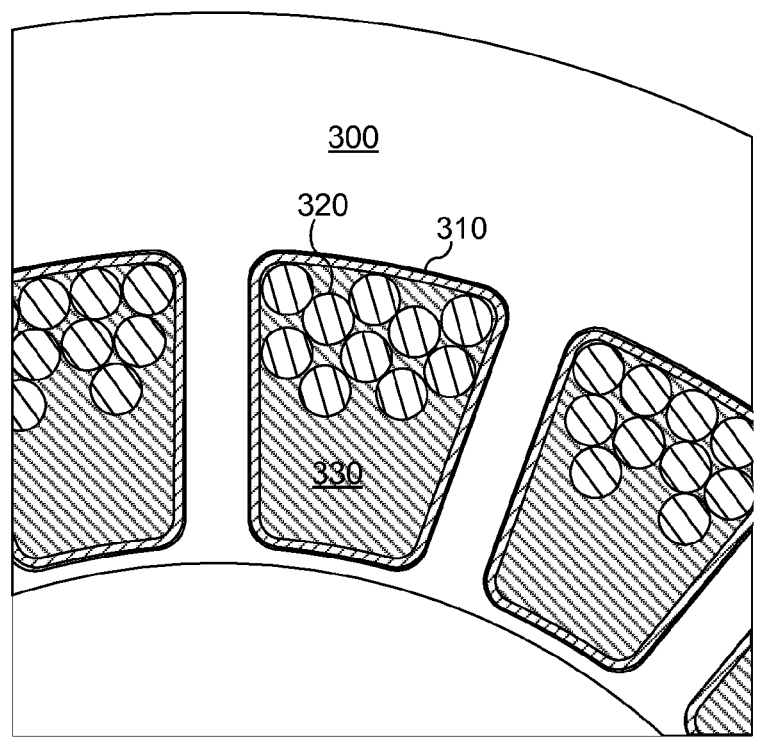
FIG. 3 is a diagram illustrating a closed-slot stator for an electric motor where the slots are completely filled with epoxy or varnish.
Figure 4:
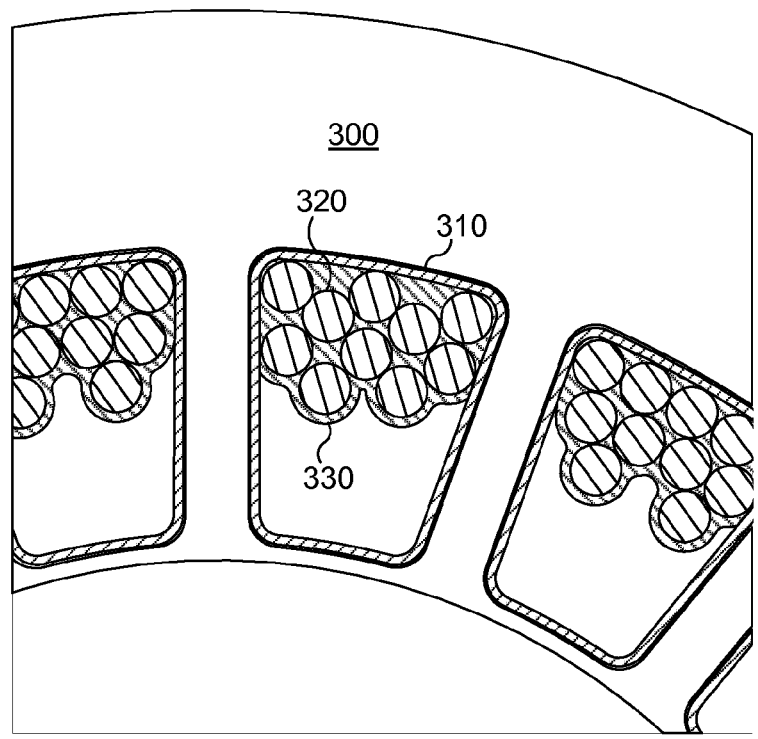
FIG. 4 is a diagram illustrating a closed-slot stator for an electric motor where the slots are partially filled with epoxy or varnish.

Conventionally, the installed wires are restrained by encapsulating all or part of the wires in a material such as varnish or epoxy. This is illustrated in FIGS. 3 and 4. FIG. 3 depicts a stator in which the slots are entirely filled, while FIG. 4 depicts a stator in which the slots are only partially filled. In both figures, slot liners (e.g., 310) are positioned in each of the slots of stator 300. Multiple turns of magnet wire (e.g., 320) are threaded through each of the slots. In FIG. 3, epoxy or varnish (e.g., 330) fills the remaining space in each of the slots. In FIG. 4, the wires are coated with epoxy or varnish (e.g., 330) to encapsulate them and prevent movement within the slots, but the slots are not entirely filled.

As noted above, epoxies and varnishes may become chemically unstable and break down at extremely high temperatures, such as may be encountered in wells that employ SAGD (steam assisted gravity drain) techniques. For this reason, if it is known that the motor will be used at extremely high temperatures, epoxies and varnishes may not be used at all, and the magnet wires may be left unrestrained. If epoxies or varnishes are used, and they break down, they may no longer be able to effectively restrain the magnet wires within the slots. The wires may then move, allowing them to sustain damage. Further, if the epoxies or varnishes break down, they may chemically attack the magnet wires. In either case, the resulting damage to the wires can shorten the life of the motor.

Figure 5A:
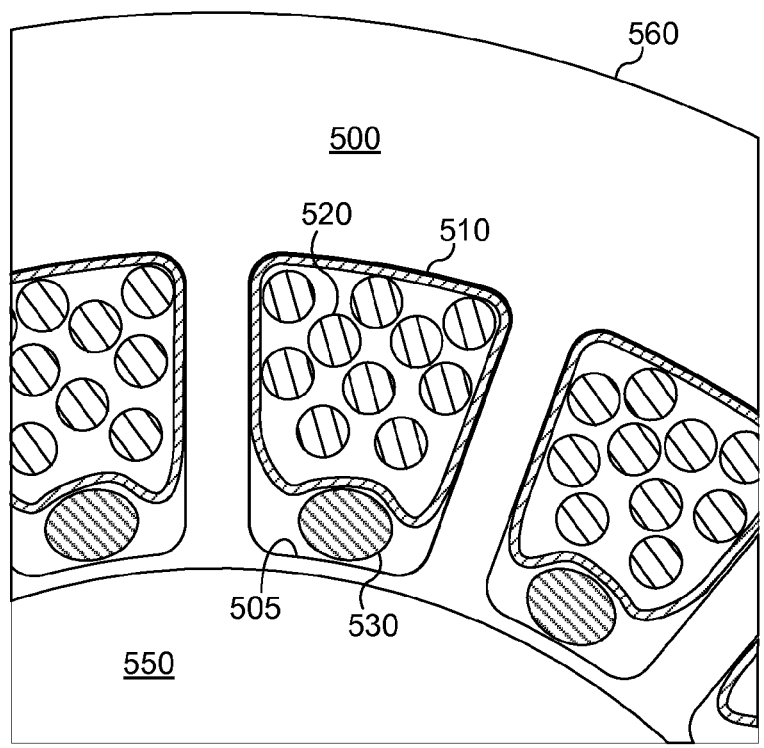
FIGS. 5A and 5B are diagrams illustrating a closed-slot stator for an electric motor in accordance with one embodiment where expansion pads are positioned between the slot liners and the slot walls.
Figure 5B:
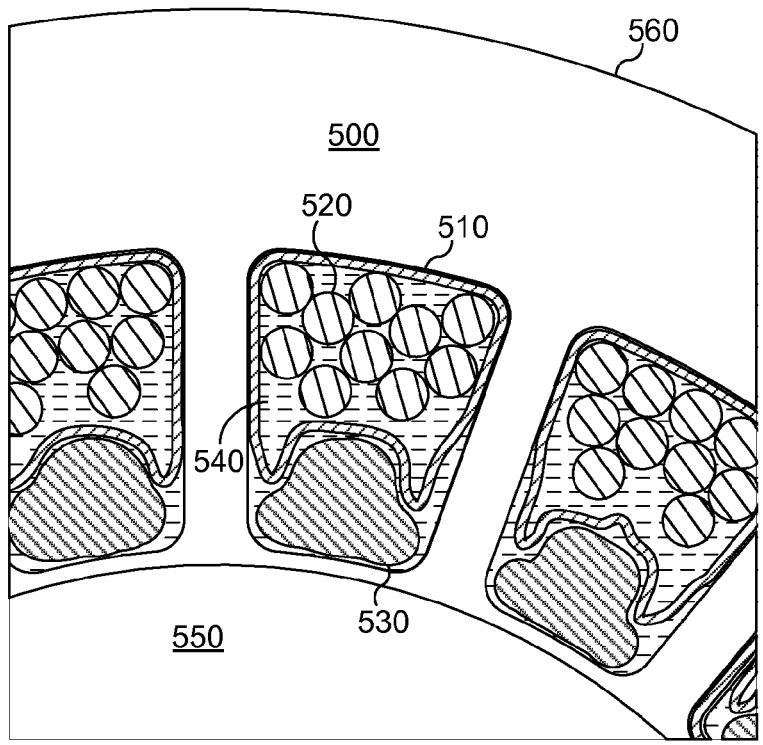

The present systems and methods therefore employ mechanical means to restrain the wires within the slots. Referring to FIGS. 5A and 5B, a first embodiment is illustrated. In this embodiment, slot liners (e.g., 510) are inserted into each of the slots of a stator core 500. An expansion pad (e.g., 530) is inserted into each slot between the slot liner and the wall of the slot (e.g., 505). In this embodiment, the expansion pads extend along the length of the slots. Multiple turns of magnet wire (e.g., 520) are then threaded through the slots inside the respective slot liners.

FIG. 5A illustrates the components of the system after the magnet wires have been threaded through the slots. The expansion pads are in a non-expanded state and each pad occupies an initial volume that allows sufficient space that the wires can be threaded through the slots. FIG. 5B illustrates the components of the system after the motor has been filled with oil 540. It can be seen that the expansion pads, which absorb the oil, expand in the slots. The expanded pads take up at least a portion of the space in the slot that was unoccupied prior to addition of the oil. The expanded pads do not necessarily take up all of the remaining space in the slots. The expansion of the pads forces the slot liners inward, toward the wires, so that they have less room to move in the slots. The expanded pads thereby serve to mechanically restrain the movement of the wires in the slots.

The expansion pads may be made of any suitable material. In one embodiment, the pads are made of EPDM (ethylene propylene diene monomer) rubber. EPDM has good heat resistance and is compatible with the oil with which the motor is filled. The EPDM is formed into a rope that is strong enough to be pulled through the slots without difficulty and can expand when it absorbs the oil with which the slots are filled. Other materials (e.g., materials that have shape memory) can also be used in alternative embodiments. These materials should have high temperature resistance if intended for use in high-temperature applications, and should be capable of being manufactured in a form that can be expanded from an initial volume to a greater volume in the stator slots. (It should be noted that the expansion pads may be used in applications that are not subject to extremely high temperatures, in which case the material of the pads not have high temperature resistance.) The expansion pads may also have any suitable structure, such as a braided rope or woven pad, that allows the material to be expanded. The use of the term "pad" should not be construed to imply any particular shape or structure. Further, the expansion pads may employ an expansion mechanism other than the absorption of oil into the pads.

It can be seen that each expansion pad in FIGS. 5A and 5B is positioned between the slot liner (e.g., 510) and the wall (e.g., 505) of the slot which is closest to bore 550 of stator 500. This positioning may be advantageous because the expansion pad may have thermally insulating properties. By placing the expansion pad adjacent to the bore of the stator, the wires in the slot are shielded from heat that may be generated by the rotor as it rotates within the bore of the stator. Possibly more important is that the expansion pad does not cause heat generated by the magnet wires to be retained within the stator, as might be the case if the expansion pad were positioned between the wires and the exterior 560 of the stator core.

Figure 6A:
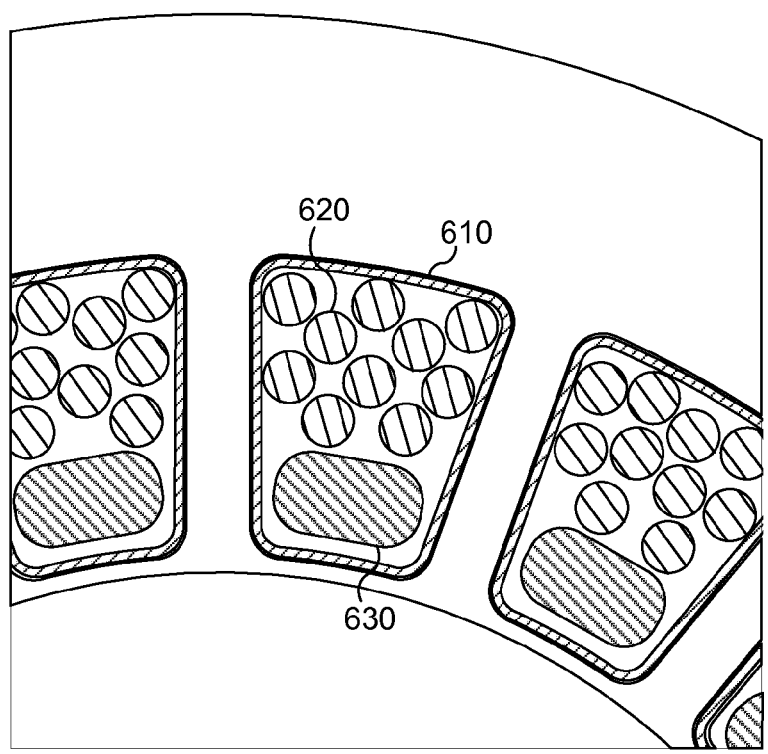
FIGS. 6A and 6B are diagrams illustrating a closed-slot stator for an electric motor in accordance with one embodiment where expansion pads are positioned within the slot liners.
Figure 6B:
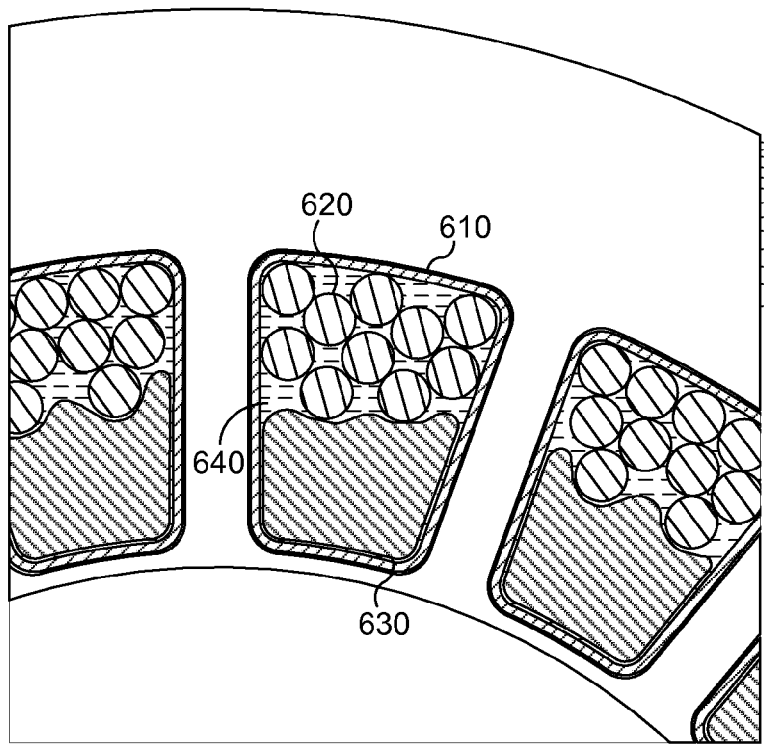

Alternative embodiments may incorporate a number of variations from the embodiment of FIGS. 5A and 5B. For instance, in the embodiment of FIGS. 6A and 6B, the expansion pads (e.g., 630) are positioned inside the slot liners (e.g., 610), rather than between the slot liners and the walls of the slots. The turns of magnet wire (e.g., 620) are then threaded through the slots inside the respective slot liners. Similar to FIGS. 5A and 5B, FIGS. 6A and 6B, respectively, show the components of the system before and after the stator slots are filled with oil 640. As in the previously described embodiment, the oil is absorbed by the expansion pads, which then expand to fill much of the previously unoccupied space within the slot, thereby mechanically inhibiting movement of the wires within the slots.

Figure 7:
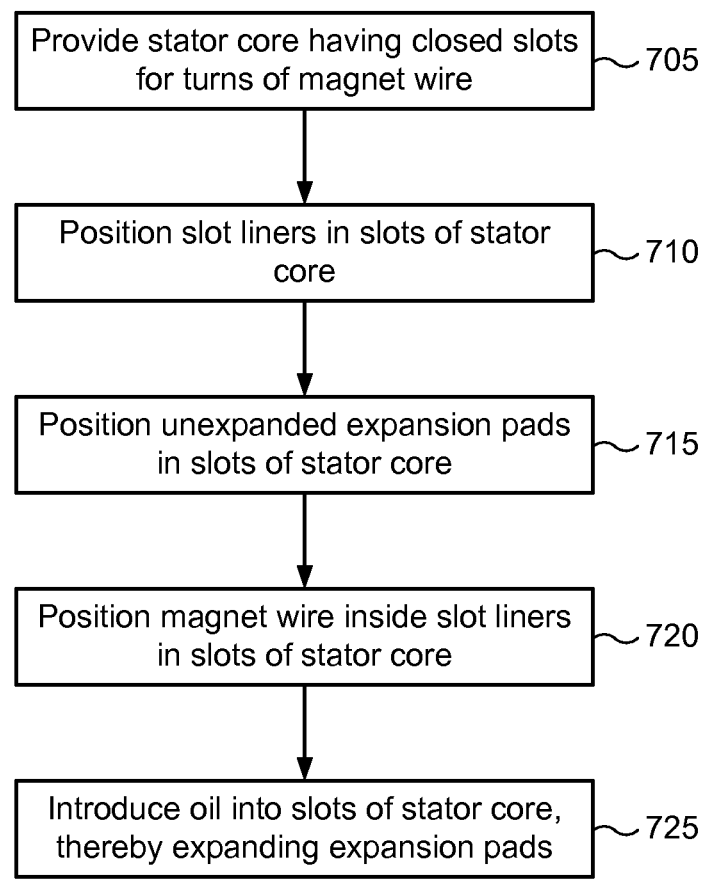
FIG. 7 is a flow diagram illustrating a method for constructing a motor in accordance with one embodiment.

Another alternative embodiment comprises a method for constructing a motor of the type described above. An exemplary method is depicted in the flow diagram of FIG. 7. The first step in this method is to provide a stator core having a plurality of closed slots (705). The stator core may, for example, consist of a plurality of laminations that are pressed into a housing. Slot liners are then inserted into each of the slots (710). Expansion pads are then inserted into each of the slots as well (715). As noted above, the expansion pads may be positioned within the slot liners, or between the slot liners and slot walls. The magnet wires are then threaded through the slots to form the desired number of magnet windings (720). Oil is then introduced into the slots of the stator (725), where it is absorbed by the expansion pads. The expansion pads consequently swell to occupy an increased volume within the slots, thereby mechanically restraining the wires in the slots. The oil is typically introduced into the slots after the rotor and stator of the motor are assembled, so that the motor is filled with oil. After the motor is filled with oil, it is sealed.

Alternative embodiments may incorporate variations from the foregoing embodiments, some of which are described above. For instance, the expansion pads may comprise materials other than EPDM, and they may have various shapes (e.g., ropes, flat sheets, rectangular, round or oblong shapes, or irregular shapes) and structures. The expansion pads may be positioned at various locations within the slots, closer to the bore of the stator or closer to the exterior of the stator, inside the slot liner or outside the slot liner. The expansion of the pads may be activated by introduction and absorption of oil, or by other means, such as activation of a shape-memory material. The steps of the methods described above may be performed in the specific order described, or in different orders. It should also be noted that, while the foregoing embodiments use expansion pads to restrain wires in the stator, other embodiments may employ this technique to restrain wires in a rotor.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for containment of magnet wires in an electric motor, the system comprising:
   an electric motor having a plurality of slots in which one or more magnet wires are positioned; and
   a plurality of expansion pads, wherein each of the expansion pads is positioned in a corresponding one of the plurality of slots;
   wherein each of the expansion pads occupies a first volume during installation of the expansion pad in the corresponding slot, and wherein after installation of the expansion pad in the corresponding slot, each expansion pad is expanded by absorption of oil into the material of the expansion pad to occupy a second volume which is greater than the first volume; and
   wherein the expanded expansion pads fill the portions of the slots not occupied by the magnet wires, thereby inhibiting movement of the magnet wires within the slots.

2. The system of claim 1, wherein each of the slots is filled with oil external to the expansion pads, and wherein each expansion pad expands upon absorbing a portion of the oil that is in the corresponding slot external to the expansion pad.

3. The system of claim 1, wherein each of the plurality of slots is located in a stator of the electric motor.

4. The system of claim 3, wherein the electric motor comprises a downhole motor coupled to drive an electric submersible pump.

5. The system of claim 3, wherein each of the expansion pads is positioned on a side of the corresponding slot which is nearest a bore of the stator.

6. The system of claim 3, wherein each of the expansion pads provides a layer of thermal insulation between the wires and a wall of the corresponding slot which is nearest a bore of the stator.

7. The system of claim 1, wherein each of the expansion pads is the same length as the corresponding slot.

8. The system of claim 1, further comprising a plurality of tubular slot liners, wherein each of the slot liners is positioned within a corresponding one of the slots, and wherein for each slot, the magnet wires in the slot are positioned within the tubular slot liner in the slot.

9. The system of claim 8, wherein each of the expansion pads is positioned external to the corresponding slot liner between the corresponding one of the slot liners and a wall of the corresponding slot, wherein in each slot, the slot liner separates the expansion pad from the magnet wires.

10. The system of claim 8, wherein each of the expansion pads is positioned inside the corresponding one of the slot liners.

11. The system of claim 1, wherein each of the plurality of expansion pads comprises a braided or woven material, wherein the oil is absorbed between fibers of the braided or woven material.

12. The system of claim 11, wherein the braided or woven material comprises a rope.

13. The system of claim 11, wherein the braided or woven material comprises ethylene propylene diene monomer (EPDM) rubber.

14. The system of claim 1, wherein each of the plurality of expansion pads comprises a non-tubular pad.

* * * * *